United States Patent
Moon et al.

(10) Patent No.: US 7,516,933 B2
(45) Date of Patent: Apr. 14, 2009

(54) PORTABLE FOLDING TYPE CRADLE

(75) Inventors: Ji-Hyun Moon, Daegu (KR); Yang-Jic Lee, Gwacheon-si (KR); Beom-Ku Han, Gyeonggi-do (KR); Chang-Hwan Hwang, Goyang-si (KR)

(73) Assignee: Samsung Electronics Co., Ltd (KR)

( * ) Notice: Subject to any disclaimer, the term of this patent is extended or adjusted under 35 U.S.C. 154(b) by 24 days.

(21) Appl. No.: 11/709,312

(22) Filed: Feb. 21, 2007

(65) Prior Publication Data

US 2007/0265030 A1    Nov. 15, 2007

(30) Foreign Application Priority Data

Feb. 21, 2006    (KR)    ........................ 10-2006-0016709

(51) Int. Cl.
*A47B 19/00*    (2006.01)

(52) U.S. Cl. ..................... 248/441.1; 248/461; 248/917

(58) Field of Classification Search ............. 248/441.1, 248/442.2, 447, 457, 460, 461, 472, 346.3, 248/917, 918, 924; 235/472.01, 486
See application file for complete search history.

(56) References Cited

U.S. PATENT DOCUMENTS

| | | | | |
|---|---|---|---|---|
| 756,486 | A | * | 4/1904 | Fleming .................... 248/456 |
| 1,203,659 | A | * | 11/1916 | Smith ........................ 248/456 |
| 2,318,192 | A | * | 5/1943 | Boelema, Jr. ................ 281/31 |
| 2,732,828 | A | * | 1/1956 | Postel et al. ................. 248/461 |
| 4,323,214 | A | * | 4/1982 | DeLuca ...................... 248/452 |
| 4,555,128 | A | * | 11/1985 | White et al. .................. 281/45 |
| 5,419,526 | A | * | 5/1995 | Chieng ....................... 248/447 |
| 5,659,236 | A | * | 8/1997 | Hahn ......................... 320/111 |
| 6,891,351 | B2 | * | 5/2005 | Chen ......................... 320/115 |
| 7,054,145 | B2 | * | 5/2006 | Tanaka et al. ............... 361/679 |
| 2007/0018000 | A1 | * | 1/2007 | Jeun et al. ................... 235/486 |
| 2008/0061205 | A1 | * | 3/2008 | Park et al. ................. 248/291.1 |

FOREIGN PATENT DOCUMENTS

| | | |
|---|---|---|
| EP | 0 099 164 A2 | 7/1983 |
| EP | 1 577 737 A1 | 9/2005 |
| EP | 1 748 629 A2 | 1/2007 |
| JP | 2001257757 | 9/2001 |
| JP | 2001-292217 | 10/2001 |
| JP | 2002064610 | 2/2002 |
| JP | 2003-298249 | 10/2003 |
| KR | 20-0375583 | 3/2005 |
| KR | 100713495 B1 | 4/2007 |

* cited by examiner

*Primary Examiner*—Korie Chan
(74) *Attorney, Agent, or Firm*—The Farrell Law Firm, PC

(57) ABSTRACT

A portable folding type cradle is provided. The portable folding type cradle includes a first cradling body; a second cradling body folded or unfolded from the first cradling body; a hinge unit for connecting the second cradling body to the first cradling body; a housing unit for connecting to the hinge unit, and housing the first and second cradling bodies or supporting the second cradling body; and at least one unit provided at the first cradling body, and preventing sliding of a portable terminal to stably support a mount state thereof, and controlling the mount state of the portable terminal.

11 Claims, 6 Drawing Sheets

PORTABLE FOLDING TYPE CRADLE

This application claims priority under 35 U.S.C. § 119 to an application entitled "Portable Folding Type Cradle" filed in the Korean Intellectual Property Office on Feb. 21, 2006 and assigned Serial No. 2006-16709, the contents of which are incorporated herein by reference.

BACKGROUND OF THE INVENTION

1. Field of the Invention

The present invention relates generally to a portable terminal such as a digital multimedia broadcasting (DMB) phone, a game phone, a camera phone, a cellular phone, a personal digital assistant (PDA), a hand held phone (HHP), and in particular, to a folding type cradle which can be carried by a string together with a portable terminal.

2. Description of the Related Art

In general, a portable terminal is an electronic device carried by a user and performing wireless communication with a called party. The trend in the development in portable terminals is towards miniaturization, slimming, gripping, and being lightweight on the basis of portability, and also to provide multimedia capabilities in pursuit of a greater variety of functions. In particular, a future portable terminal will be increasingly miniaturized, lightweight, multifunctional, and multipurpose, and will be changed and adapted to various multimedia environments or the Internet environment.

A conventional popular portable terminal is classified into several types based on appearance. For example, the portable terminal is classified into bar type, flip type, and folder type communication devices depending on appearance. Further, the portable terminal is classified into neck wearable type and wrist wearable type communication devices depending on a wearable body position or a wearing method. Furthermore, the portable terminal is classified into a rotation type or sliding type communication device. The above-listed communication devices will be easily understood by those skilled in the art.

In addition, the structure of the conventional portable terminal is evolving to provide efficient data communication based on high speed, in addition to providing a voice communication function. In other words, as consumer's desires change, a multimedia service for high-speed data communication will be provided using a wireless communication technology.

Under current circumstances, the portable terminal allows the user to view a variety of moving pictures in a digital multimedia broadcasting (DMB) mode, and to enjoy a variety of games or amusements in a multimedia environment.

However, the conventional portable terminal has a drawback, when the user views the variety of moving pictures in the DMB mode and the like, absence of a separate cradle makes the user's viewing posture inconvenient when the terminal is positioned on a table and the like. The portable terminal should be slightly inclined on the table to allow the user to conveniently view a picture displayed on a display unit.

Typically, a cradle for the portable terminal is combined with a phone charger. In general, the phone charger re-charges the portable terminal with a power source. The portable terminal is mounted on the phone charger in the length direction or on a slant, and is charged. Even when the portable terminal is mounted on the phone charger, it is impossible to control a mounting state, i.e., an inclination state.

However, the conventional phone charger could not be carried to mount the portable terminal because the phone charger is large in overall size and therefore, is virtually impossible to carry. Accordingly, a cradle that is easy to carry and mount, and having a simple mount function is required.

Further, the conventional phone charger is of a type in which the portable terminal is mounted in the length direction, and cannot be mounted in the width direction. In fact, it is sometimes convenient for the user to view the picture displayed on the display unit in the width or length direction and, in particular, when the user views a variety of moving pictures, a wide display unit is convenient for viewing. Therefore, it is required to mount the portable terminal in the width direction.

SUMMARY OF THE INVENTION

Therefore, it is an object of the present invention to provide a portable folding type cradle which is regularly carried like an accessory with a portable terminal because of its convenient size.

It is another object of the present invention to provide a portable folding type cradle for conveniently viewing information displayed on a display device, for example, in a DMB mode, thereby conveniently permitting viewing of a variety of moving pictures with the user's comfortable posture.

It is a further object of the present invention to provide a portable folding type cradle for mounting all types of portable terminals.

It is still a further object of the present invention to provide a portable folding type cradle which can conveniently allow all portable terminals to be mounted in the width or length direction and thus, its use is convenient.

It is still another object of the present invention to provide a portable folding type cradle which has a foldable structure for simplicity and convenience in manufacturing.

It is a yet another object of the present invention to provide a portable folding type cradle in which cradling bodies are entirely housed in a housing unit, thereby protecting the cradled bodies during carrying or if dropped.

To achieve the above and other objects of the present invention, there is provided a portable folding type cradle including a first cradling body; a second cradling body folded or unfolded from the first cradling body; a hinge unit for connecting the second cradling body to the first cradling body; a housing unit for connecting to the hinge unit, and housing the first and second cradling bodies or supporting the second cradling body; and at least one unit provided at the first cradling body, and preventing sliding of a portable terminal to stably support a mount state thereof, and controlling the mount state of the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
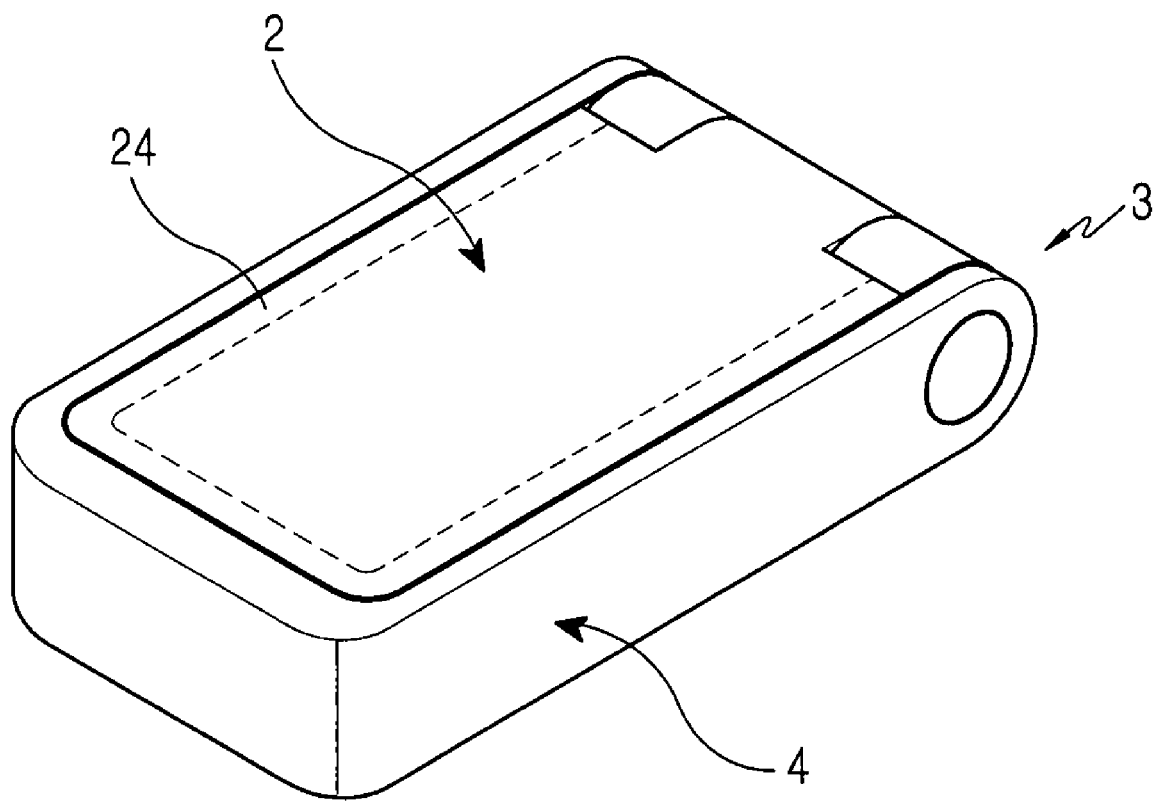
FIG. 1 is a perspective view illustrating a portable folding type cradle in a folded state according to the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
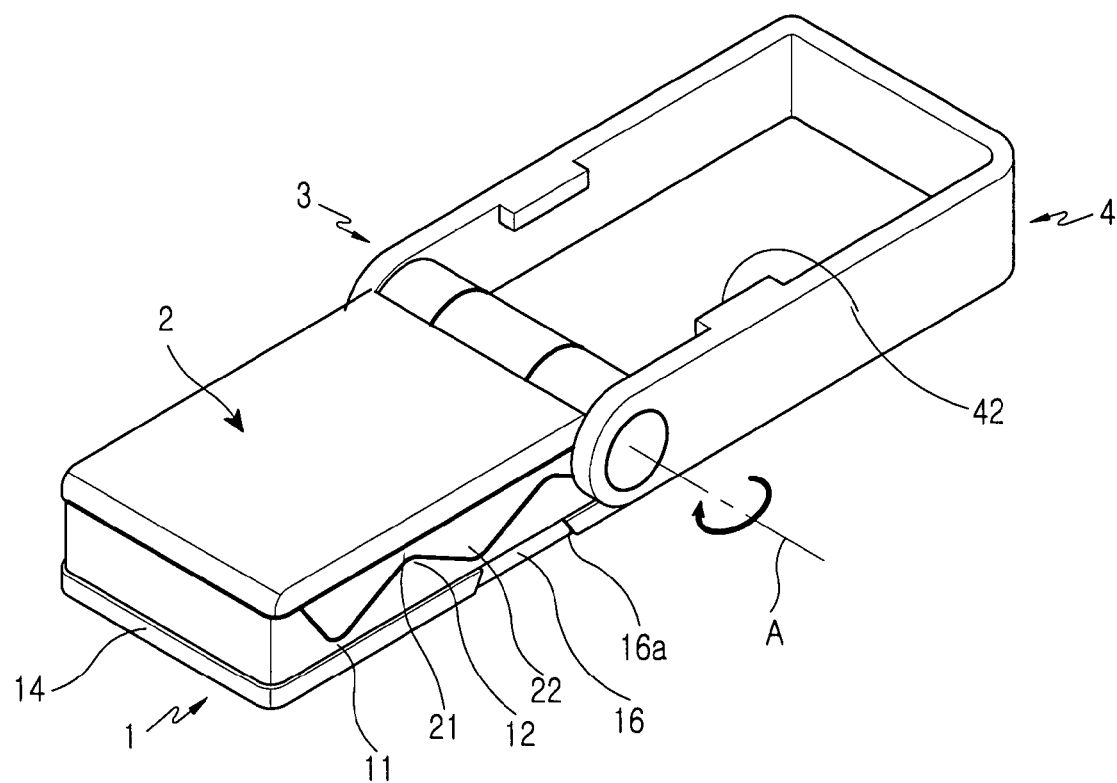
FIG. 2 is a perspective view illustrating a portable folding type cradle in a state in which two cradling bodies rotate according to the present invention.

Referring to FIGS. 1 and 2, a portable folding type cradle according to the present invention is of a foldable type having a convenient size as an accessory for easy carriage. In detail, the inventive cradle includes a first cradling body 1, a second cradling body 2, a hinge unit 3, a housing unit 4, and at least one unit provided between the first and second cradling bodies 1 and 2 and supporting a portable terminal in a cradling position thereof. The second cradling body 2 rotatably connects to the first cradling body 1 using the hinge unit 3 such that the second cradling body 2 is folded or unfolded in association to the first cradling body 1. A folded state is shown in FIG. 1, and an unfolded state is shown in FIG. 2.

Figure 3:
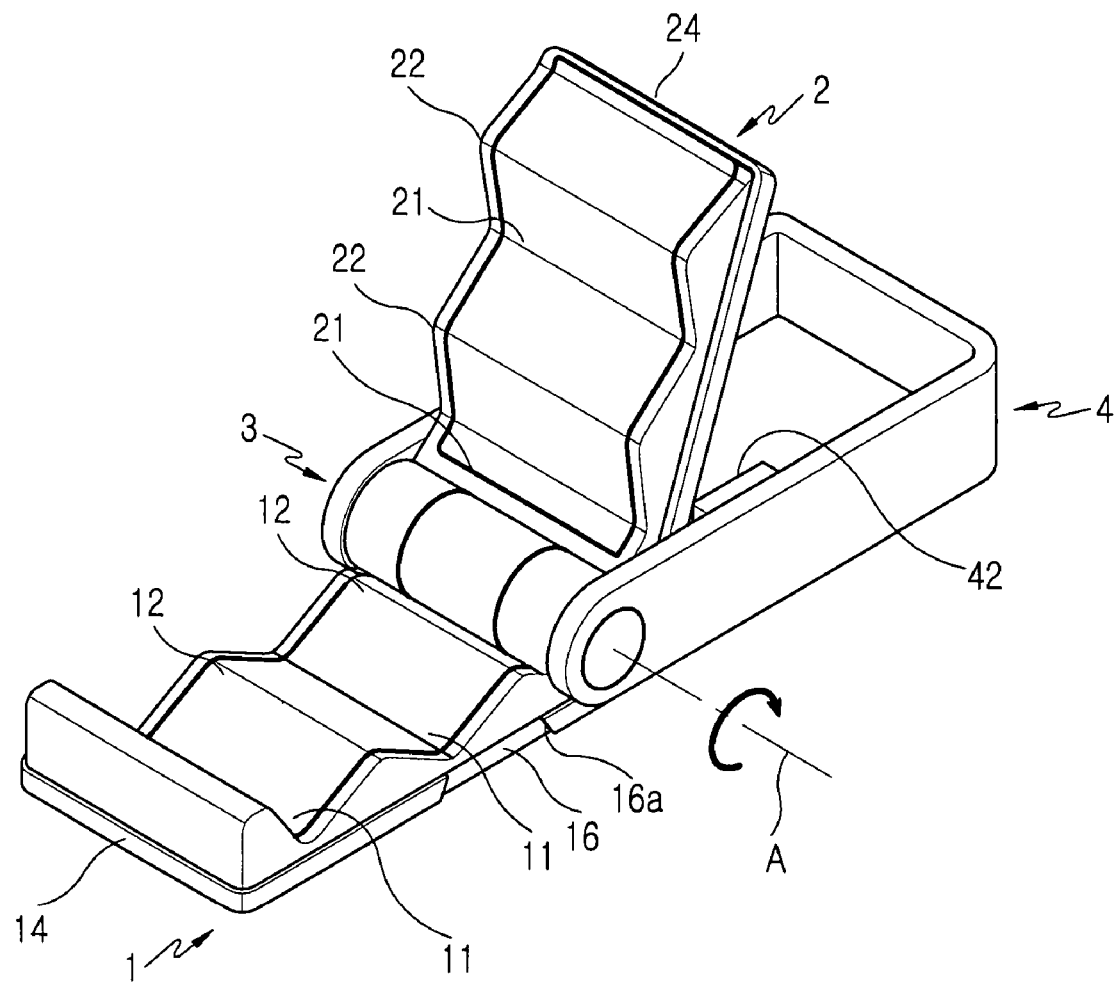
FIGS. 3 and 4 are perspective views illustrating a portable folding type cradle in a state in which a portable terminal can be mounted according to the present invention.
Figure 4:
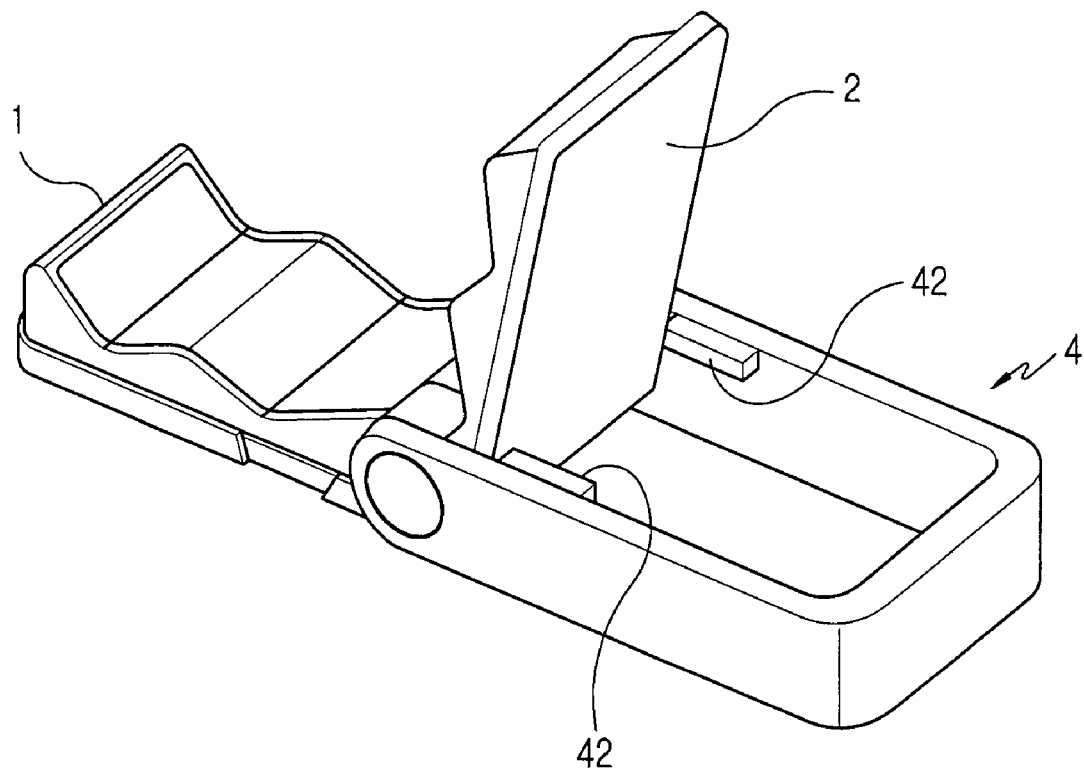
Figure 5:
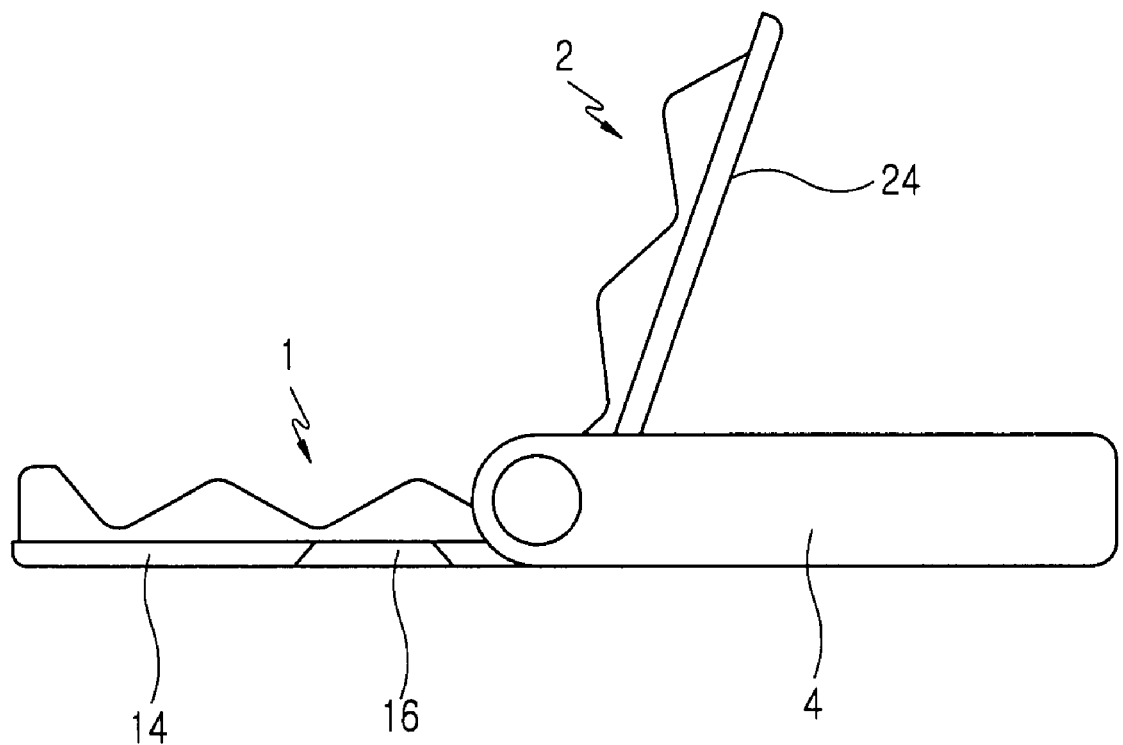
FIG. 5 is a side view of FIG. 3.

The hinge unit 3 serves as a hinge axis (A) of the first and second cradling bodies 1 and 2, and the housing unit 4. In particular, the first and second cradling bodies 1 and 2 are rotatably connected with each other, and the housing unit 4 connects to the first and second cradling bodies 1 and 2 such that it rotates outside of the first and second cradling bodies 1 and 2 with respect to the hinge unit 3. In other words, the first and second cradling bodies 1 and 2 and the housing units 4 are connected with each other using the same hinge axis (A). The housing unit 4 houses the first and second cradling bodies 1 and 2 with safety, or supports the second cradling body 2. FIG. 1 illustrates a state in which the housing unit 4 houses the first and second cradling bodies 1 and 2. FIGS. 3 to 5 illustrate states in which the housing unit 4 supports the second cradling body 2. The housing unit 4 is opened at its upper and lower portions to entirely house the first and second cradling bodies 1 and 2. The housing unit 4 supports the second cradling body 2 with slant in rear thereof. Of course, in a mount state, the housing unit 4 is placed on a surface.

Figure 6:
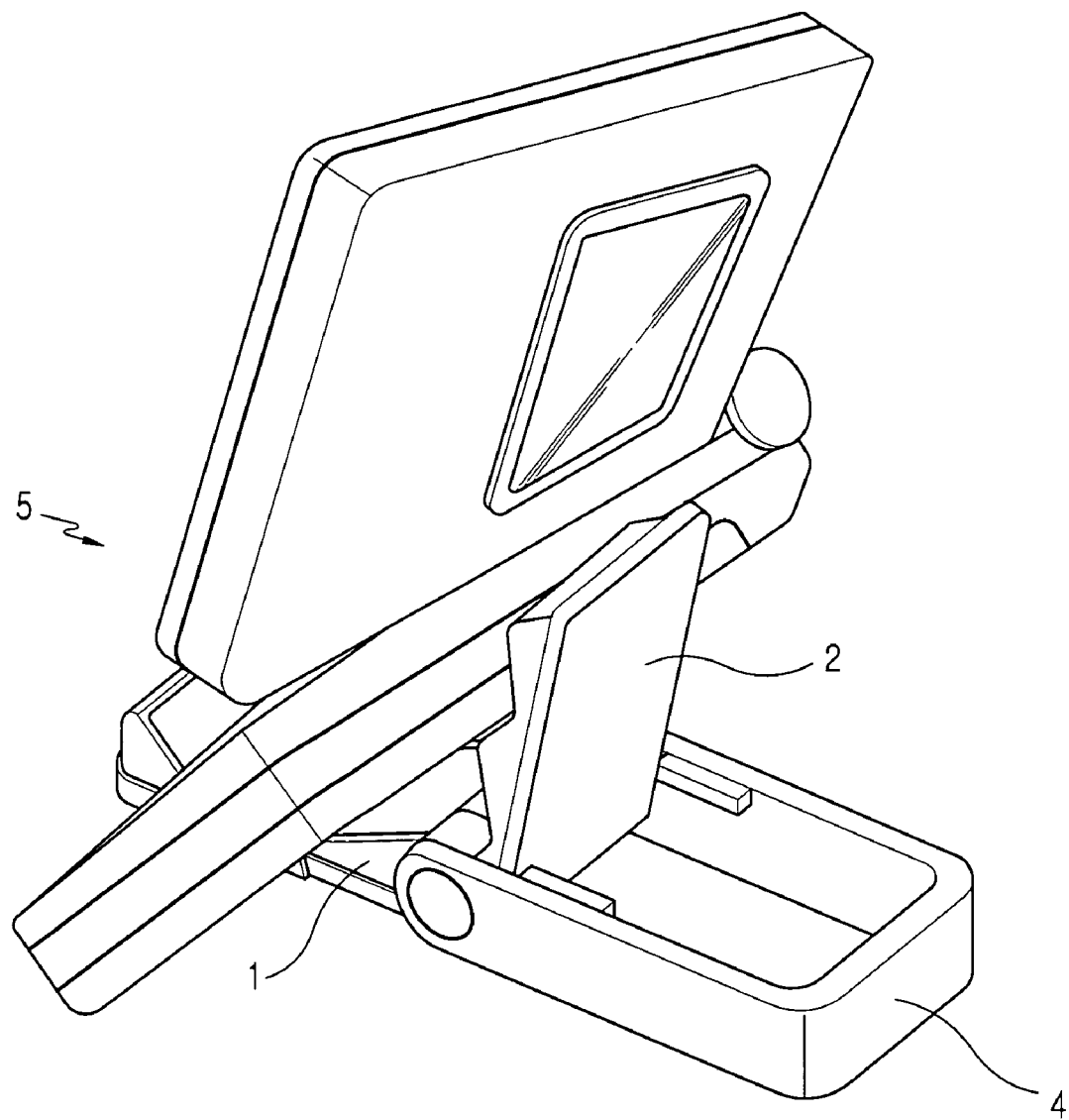
FIG. 6 is a perspective view illustrating a portable folding type cradle on which a portable terminal is mounted according to the present invention.

The tilt mount state of the portable terminal 5 is shown in FIG. 6. The unit is provided at the first cradling body 1, and is in direct contact with a predetermined portion of the portable terminal 5, thereby preventing the mounted portable terminal from sliding towards the ground and supporting a tilt state of the portable terminal 5. Further, the unit controls the mount state, in detail, a tilt mount state of the mounted portable terminal 5.

The unit includes at least one first concave-convex part 11 and 12 provided on the first cradling body 1 having a concave part 11 and a convex part 12 provided in an alternate manner, and it is provided in parallel with the extension direction of the hinge unit 3. Further, the first concave-convex part 11 and 12 is provided to have a wave-shaped section, and is provided to have a gently curved shape.

The second cradling body 2 further includes at least one second concavo-convex part 21 and 22 on its bottom having a concave part 21 and a convex part 22 provided in an alternate manner, and it extends in parallel with the hinge unit 3. Further, the second concave-convex part 21 and 22 is provided to have a wave-shaped section, and is provided to have a gently curved shape.

As shown in FIGS. 1 and 2, in case where the second cradling body 2 is completely folded to the first cradling body 1, the concave part 11 of the first concavo-convex part is exactly inserted to the convex part 22 of the second concavo-convex part, and the convex part 12 of the first concave-convex part is exactly inserted into the concave part 21 of the second concave-convex part. In other words, when the first and second concave-convex parts 11, 12 and 21, 22 are provided to match with each other in shape and are completely folded, a fold thickness is minimized. As a result, the first and second concave-convex parts 11, 12 and 21, 22 perform a triple function of stably holding the portable terminal in the mount position thereof, contributing to minimization of a total thickness of the first and second cradling bodies 1 and 2 to thereby provide a slim body in whole, and, owing to the concave or convex parts provided in plural, controlling a mount angle of the tilted portable terminal.

In order for the first and second cradling bodies 1 and 2 to be completely released from the housing unit 4 using rotation operation to mount the portable terminal, the first cradling body 1 can be supported by a bottom and the second cradling body 2 can be tilted. The present invention further includes a support unit for supporting the second cradling body 2 at the tilt state thereof in the housing unit 4. The support unit includes at least one stopper 42 having a protrusion shape and provided within the housing unit 4, and a frame unit 24 protruded outside of the second cradling body 2 and stopping rotation by the stopper 42. The stoppers 42 are provided in a pair, and are protruded to face each other. The frame unit 24 is extended and provided along an upper and outer edge of the second cradling body 2. If the second cradling body 2 continuously rotates, its rotation is resultantly stopped using the stopper 42, and stopping is maintained without further rotation. This state is shown in FIGS. 3 to 5 respectively.

The first cradling body 1 further includes a frame unit 14 protruded outside thereof. The frame unit 14 has at least one groove 16 to be housed in the housing unit 4. The grooves 16 are provided in a pair and are matched with the stopper 42. The groove 16 is to allow the first cradling body 1 to be completely housed in the housing unit 4 without interference of the stopper 42 caused by rotation. In particular, a side surface 16a of the groove 16 is inclined to minimize the interference of the stopper 42 caused by the rotation.

Further, the second cradling body 2 can rotate at an angle of 0 degree to 270 degrees or more. The second cradling body 2 can be provided to employ a manual, automatic, or semi-automatic manner based on a hinge module (not shown). Depending on a position of the stopper 42, an amount of rotation of the second cradling body 2 can be controlled and thus the mount state, in detail, a tilt degree of the portable terminal can be controlled.

As shown in FIG. 6, the portable terminal 5 can be mounted on the cradle in a tilt position. A predetermined portion of the portable terminal 5 directly contacts or inserts into the concave part 11 of the first concave-convex part 11 and 12 of the first cradling body 1, thereby preventing sliding of the portable terminal. The predetermined portion of the portable terminal 5 contacts one chosen from a plurality of concave parts 11, thereby controlling the tilt mount state. Of course, the mount state of the portable terminal is primarily maintained by the first concave-convex part 11 and 12 of the first cradling body 1, and is secondarily maintained by the second concave-convex part 21 and 22 of the second cradling body 2. When a predetermined portion of the portable terminal 5 contacts one, which is distant away from the hinge unit 3, of the concave parts 11 of the first concave-convex part 11 and 12, the portable terminal is maintained in a gentle tilt mount state. When a predetermined portion of the portable terminal 5 contacts the concave part closest to the hinge unit 3, the portable terminals is maintained in a sudden tilt mount state.

FIG. 6 illustrates the mount state in which the portable terminal 5 is placed on the cradle in the width direction. This is to provide a display unit based on a wide view mode installed in the portable terminal 5. Certainly the portable terminal 5 can be mounted on the cradle in the length direction.

In the present invention, the plurality of concave-convex parts are provided and therefore, the portable terminal can be supported in its mount position. The inventive cradle can be minimized in thickness and therefore, is advantageous for miniaturization, and can control the tilt mount angle of the portable terminal. The inventive cradle can selectively mount the portable terminal in either the width direction or length direction. Furthermore, the inventive cradle has a folding type simple structure therefore, it is advantageous in that manufacturing is easy, and user economy and easy manipulation are achieved, as well as all terminals can be mounted. Furthermore, the inventive cradle is very effective in viewing a variety of moving pictures in the DMB mode and the like. Furthermore, the inventive cradle has an advantage in that the cradling body can be entirely housed and protected in the housing.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable folding type cradle for mounting a portable terminal, comprising:
   a first cradling body;
   a second cradling body;
   a hinge unit for connecting the second cradling body to the first cradling body to fold or unfold the second cradling body with respect to the first cradling body in a closed position and at least one opened position;
   a housing unit connected to the hinge unit, the housing unit entirely housing and protecting the first and second cradling bodies in the closed position, and having an upper portion and a lower portion opposite to the upper portion, both the upper and lower portions being opened; and
   at least one unit provided at the first cradling body, and preventing sliding of the portable terminal to stably support a mount state thereof, and controlling the mount state of the portable terminal.

2. The portable folding type cradle of claim 1, wherein the at least one unit comprises at least one first concave-convex part provided on the first cradle body, and the first concave-convex part extends in parallel with an extension direction of the hinge unit.

3. The portable folding type cradle of claim 2, wherein the first concave-convex part has a wave shape.

4. The portable folding type cradle of claim 2, wherein the second cradling body further comprises at least one second concave-convex part, and the second concave-convex part extends in parallel with the extension direction.

5. The portable folding type cradle of claim 4, wherein the second concave-convex part has a wave shape.

6. The portable folding type cradle of claim 4, wherein, when the second cradling body is folded to the first cradling body, a concave part of the first concave-convex part is aligned with a convex part of the second concave-convex, and a convex part of the first concave-convex part is aligned with a concave part of the second concave-convex part.

7. The portable folding type cradle of claim 1, further comprising a support unit for supporting a tilt state of the second cradling body in the housing unit.

8. The portable folding type cradle of claim 7, wherein the support unit comprises:
   a stopper provided in the housing unit; and
   a first frame unit protruding outside of the second cradling body, and stopping rotation by the stopper.

9. The portable folding type cradle of claim 8, wherein the first cradling body further comprises a second frame unit provided to protrude outside, and the second frame unit has a groove for housing the stopper.

10. The portable folding type cradle of claim 1, wherein the second cradling body is constructed to rotate at an angle of at least 270 degrees with respect to the first cradling body.

11. The portable folding type cradle of claim 1, wherein the housing unit supports the second cradling body when the portable terminal is mounted to the portable folding type cradle.

\* \* \* \* \*